United States Patent
Shimoyama

(10) Patent No.: US 6,954,527 B2
(45) Date of Patent: Oct. 11, 2005

(54) NETWORK CONFIGURATION CONTROL METHOD AND NETWORK CONFIGURATION CONTROL UNIT

(75) Inventor: Motoaki Shimoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 385 days.

(21) Appl. No.: 10/078,369

(22) Filed: Feb. 19, 2002

(65) Prior Publication Data

US 2002/0080814 A1 Jun. 27, 2002

Related U.S. Application Data

(63) Continuation of application No. PCT/JP99/05371, filed on Sep. 30, 1999.

(51) Int. Cl.[7] .................................................. H04M 7/00
(52) U.S. Cl. ................................................. 379/221.06
(58) Field of Search .......................... 707/1–3; 379/219, 379/220.01, 221.01; 370/443, 468

(56) References Cited

U.S. PATENT DOCUMENTS

| | | | | |
|---|---|---|---|---|
| 4,814,762 A | * | 3/1989 | Franaszek | 340/2.2 |
| 5,719,928 A | * | 2/1998 | Pinnell et al. | 379/202.01 |
| 6,343,122 B1 | * | 1/2002 | Andersson | 379/219 |
| 6,668,048 B1 | * | 12/2003 | Suga et al. | 379/202.01 |

FOREIGN PATENT DOCUMENTS

| | | |
|---|---|---|
| JP | 52120603 | 10/1977 |
| JP | 04286231 | 10/1992 |
| JP | 05063705 | 3/1993 |
| JP | 08-125654 | 5/1996 |
| JP | 9-51379 | 2/1997 |
| JP | 10051456 | 2/1998 |
| JP | 11032083 | 2/1999 |

* cited by examiner

*Primary Examiner*—Benny Tieu
(74) *Attorney, Agent, or Firm*—Katten Muchin Rosenman LLP

(57) ABSTRACT

A network configuration control method and a configuration control unit enable configuration reservations of a network. Simultaneous reservation of opening and closing of a network section is performed if the same network section is not in operation at the time of opening and if there is no previous reservation for the same network section between time of the opening and time of the closing. Further, simultaneous reservation of closing and opening of the network section is performed if the same network section is in operation at the time of the closing and if there is no previous reservation of the same network section between time of the closing and time of the opening. Furthermore, when a network reservation is to be cancelled, a cancellation is performed if there is no reservation of the same network section after reservation time of the reservation to cancel, or if, in the case that there is a previous reservation of the same network section after reservation time of the reservation to cancel, the previous reservation may be cancelled.

11 Claims, 21 Drawing Sheets

FIG.5A
TIME T
FIG.5B
TIME T+α
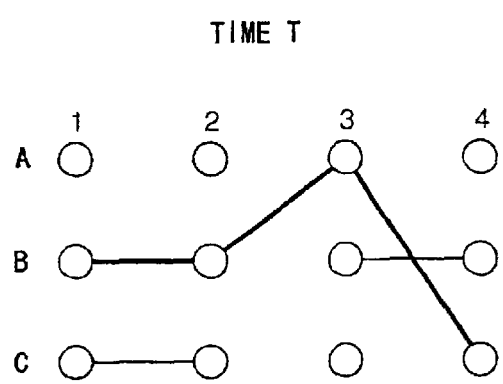
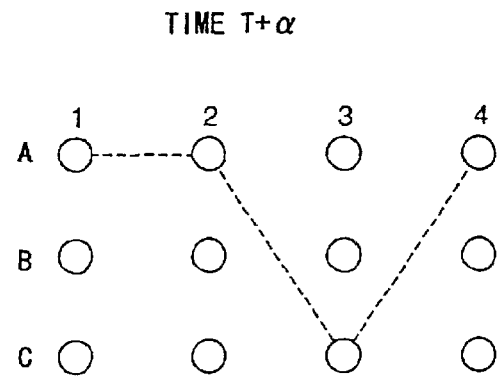
———— PATH IN OPERATION AT TIME T (B1-B2-A3-C4)
------ PATH DESIRED TO RESERVE AFTER TIME ELAPSE OF α (A1-A2-C3-A4)
_____ RESERVED PATHS AS OF TIME T (C1-C2 AND B3-B4)

FIG.10

BEFORE CONFIGURATION

| 20. RESERVATION NUMBER | 21. RESERVATION DATE | 22. OPERATION FLAG | 23. RESERVATION FLAG | 24. CONFIGURATION SECTION | 25. OPENING FLAG | 26. OPENING TIME | 27. CLOSING FLAG | 28. CLOSING TIME | 29. PRIORITY RANK |
|---|---|---|---|---|---|---|---|---|---|
| B1 | xx/xx/xx xx:xx | — | ○ | CONFIGURATION SECTION B | ○ | xx/xx/xx xx:xx | — | — | xx |
| B2 | xx/xx/xx xx:xx | — | ○ | CONFIGURATION SECTION B | — | — | ○ | xx/xx/xx xx:xx | xx |

AFTER CONFIGURATION

| 20. RESERVATION NUMBER | 21. RESERVATION DATE | 22. OPERATION FLAG | 23. RESERVATION FLAG | 24. CONFIGURATION SECTION | 25. OPENING FLAG | 26. OPENING TIME | 27. CLOSING FLAG | 28. CLOSING TIME | 29. PRIORITY RANK |
|---|---|---|---|---|---|---|---|---|---|
| A1 | xx/xx/xx xx:xx | — | ○ | CONFIGURATION SECTION A | ○ | xx/xx/xx xx:xx | — | — | xx |
| B1 | xx/xx/xx xx:xx | — | ○ | CONFIGURATION SECTION B | ○ | xx/xx/xx xx:xx | — | — | xx |
| B2 | xx/xx/xx xx:xx | — | ○ | CONFIGURATION SECTION B | — | — | ○ | xx/xx/xx xx:xx | xx |
| B3 | xx/xx/xx xx:xx | — | ○ | CONFIGURATION SECTION B | ○ | xx/xx/xx xx:xx | — | — | xx |

FIG.11

BEFORE CONFIGURATION

| 20. RESERVATION NUMBER | 21. RESERVATION DATE | 22. OPERATION FLAG | 23. RESERVATION FLAG | 24. CONFIGURATION SECTION | 25. OPENING FLAG | 26. OPENING TIME | 27. CLOSING FLAG | 28. CLOSING TIME | 29. PRIORITY RANK |
|---|---|---|---|---|---|---|---|---|---|
| B1 | XX/XX/XX XX:XX | — | ○ | CONFIGURATION SECTION B | ○ | XX/XX/XX XX:XX | — | — | XX |
| B2 | XX/XX/XX XX:XX | — | ○ | CONFIGURATION SECTION B | — | — | ○ | XX/XX/XX XX:XX | XX |

AFTER CONFIGURATION

| 20. RESERVATION NUMBER | 21. RESERVATION DATE | 22. OPERATION FLAG | 23. RESERVATION FLAG | 24. CONFIGURATION SECTION | 25. OPENING FLAG | 26. OPENING TIME | 27. CLOSING FLAG | 28. CLOSING TIME | 29. PRIORITY RANK |
|---|---|---|---|---|---|---|---|---|---|
| A1 | XX/XX/XX XX:XX | — | ○ | CONFIGURATION SECTION A | ○ | XX/XX/XX XX:XX | — | — | XX |
| A2 | XX/XX/XX XX:XX | — | ○ | CONFIGURATION SECTION A | — | — | ○ | XX/XX/XX XX:XX | XX |
| B1 | XX/XX/XX XX:XX | — | ○ | CONFIGURATION SECTION B | ○ | XX/XX/XX XX:XX | — | — | XX |
| B2 | XX/XX/XX XX:XX | — | ○ | CONFIGURATION SECTION B | — | — | ○ | XX/XX/XX XX:XX | XX |
| B3 | XX/XX/XX XX:XX | — | ○ | CONFIGURATION SECTION B | ○ | XX/XX/XX XX:XX | — | — | XX |
| B4 | XX/XX/XX XX:XX | — | ○ | CONFIGURATION SECTION B | — | — | ○ | XX/XX/XX XX:XX | XX |

FIG.12

BEFORE CONFIGURATION

| 20. RESERVATION NUMBER | 21. RESERVATION DATE | 22. OPERATION FLAG | 23. RESERVATION FLAG | 24. CONFIGURATION SECTION | 25. OPENING FLAG | 26. OPENING TIME | 27. CLOSING FLAG | 28. CLOSING TIME | 29. PRIORITY RANK |
|---|---|---|---|---|---|---|---|---|---|
| — | — | ○ | — | CONFIGURATION SECTION C | — | — | — | — | — |
| — | — | ○ | — | CONFIGURATION SECTION D | — | — | — | — | — |
| D1 | xx/xx/xx xx:xx | — | ○ | CONFIGURATION SECTION D | — | — | ○ | xx/xx/xx xx:xx | xx |
| D2 | xx/xx/xx xx:xx | — | ○ | CONFIGURATION SECTION D | ○ | xx/xx/xx xx:xx | — | — | xx |

AFTER CONFIGURATION

| 20. RESERVATION NUMBER | 21. RESERVATION DATE | 22. OPERATION FLAG | 23. RESERVATION FLAG | 24. CONFIGURATION SECTION | 25. OPENING FLAG | 26. OPENING TIME | 27. CLOSING FLAG | 28. CLOSING TIME | 29. PRIORITY RANK |
|---|---|---|---|---|---|---|---|---|---|
| — | — | ○ | — | CONFIGURATION SECTION C | — | — | — | — | xx |
| C1 | xx/xx/xx xx:xx | — | ○ | CONFIGURATION SECTION C | — | — | ○ | xx/xx/xx xx:xx | xx |
| — | — | ○ | — | CONFIGURATION SECTION D | — | — | — | — | xx |
| D1 | xx/xx/xx xx:xx | — | ○ | CONFIGURATION SECTION D | — | — | ○ | xx/xx/xx xx:xx | xx |
| D2 | xx/xx/xx xx:xx | — | ○ | CONFIGURATION SECTION D | ○ | xx/xx/xx xx:xx | — | — | xx |
| D3 | xx/xx/xx xx:xx | — | ○ | CONFIGURATION SECTION D | — | — | ○ | xx/xx/xx xx:xx | xx |

FIG.13

BEFORE CONFIGURATION

| 20. Reservation Number | 21. Reservation Date | 22. Operation Flag | 23. Reservation Flag | 24. Configuration Section | 25. Opening Flag | 26. Opening Time | 27. Closing Flag | 28. Closing Time | 29. Priority Rank |
|---|---|---|---|---|---|---|---|---|---|
| — | — | ○ | — | Configuration Section C | — | — | — | — | — |
| — | — | ○ | — | Configuration Section D | — | — | — | — | — |
| D1 | xx/xx/xx xx:xx | — | ○ | Configuration Section D | — | — | ○ | xx/xx/xx xx:xx | xx |
| D2 | xx/xx/xx xx:xx | — | ○ | Configuration Section D | ○ | xx/xx/xx xx:xx | — | — | xx |

AFTER CONFIGURATION

| 20. Reservation Number | 21. Reservation Date | 22. Operation Flag | 23. Reservation Flag | 24. Configuration Section | 25. Opening Flag | 26. Opening Time | 27. Closing Flag | 28. Closing Time | 29. Priority Rank |
|---|---|---|---|---|---|---|---|---|---|
| — | — | ○ | — | Configuration Section C | — | — | — | — | — |
| C1 | xx/xx/xx xx:xx | — | ○ | Configuration Section C | — | — | ○ | xx/xx/xx xx:xx | xx |
| C2 | xx/xx/xx xx:xx | — | ○ | Configuration Section C | ○ | xx/xx/xx xx:xx | — | — | xx |
| — | — | ○ | — | Configuration Section D | — | — | — | — | — |
| D1 | xx/xx/xx xx:xx | — | ○ | Configuration Section D | — | — | ○ | xx/xx/xx xx:xx | xx |
| D2 | xx/xx/xx xx:xx | — | ○ | Configuration Section D | ○ | xx/xx/xx xx:xx | — | — | xx |
| D3 | xx/xx/xx xx:xx | — | ○ | Configuration Section D | — | — | ○ | xx/xx/xx xx:xx | xx |
| D4 | xx/xx/xx xx:xx | — | ○ | Configuration Section D | ○ | xx/xx/xx xx:xx | — | — | xx |

FIG.14

| 20. RESERVATION NUMBER | 21. RESERVATION DATE | 22. OPERATION FLAG | 23. RESERVATION FLAG | 24. CONFIGURATION SECTION | 25. OPENING FLAG | 26. OPENING TIME | 27. CLOSING FLAG | 28. CLOSING TIME | 29. PRIORITY RANK |
|---|---|---|---|---|---|---|---|---|---|
| A1 | XX/XX/XX XX:XX | — | ○ | CONFIGURATION SECTION A | ○ | XX/XX/XX XX:XX | — | — | XX |
| A2 | XX/XX/XX XX:XX | — | ○ | CONFIGURATION SECTION A | — | — | ○ | XX/XX/XX XX:XX | XX |
| B1 | XX/XX/XX XX:XX | — | ○ | CONFIGURATION SECTION B | ○ | XX/XX/XX XX:XX | — | — | XX |
| B2 | XX/XX/XX XX:XX | — | ○ | CONFIGURATION SECTION B | — | — | ○ | XX/XX/XX XX:XX | XX |
| B3 | XX/XX/XX XX:XX | — | ○ | CONFIGURATION SECTION B | ○ | XX/XX/XX XX:XX | — | — | XX |
| B4 | XX/XX/XX XX:XX | — | ○ | CONFIGURATION SECTION B | — | — | ○ | XX/XX/XX XX:XX | XX |
| C1 | XX/XX/XX XX:XX | — | ○ | CONFIGURATION SECTION C | — | — | ○ | XX/XX/XX XX:XX | XX |
| C2 | XX/XX/XX XX:XX | — | ○ | CONFIGURATION SECTION C | ○ | XX/XX/XX XX:XX | — | — | XX |
| D1 | XX/XX/XX XX:XX | — | ○ | CONFIGURATION SECTION D | ○ | XX/XX/XX XX:XX | — | — | XX |
| D2 | XX/XX/XX XX:XX | — | ○ | CONFIGURATION SECTION D | ○ | XX/XX/XX XX:XX | — | — | XX |
| D3 | XX/XX/XX XX:XX | — | ○ | CONFIGURATION SECTION D | — | — | ○ | XX/XX/XX XX:XX | XX |
| D4 | XX/XX/XX XX:XX | — | ○ | CONFIGURATION SECTION D | ○ | XX/XX/XX XX:XX | — | — | XX |

FIG.15

| 20. RESERVATION NUMBER | 25. OPENING FLAG | 26. OPENING TIME | 27. CLOSING FLAG | 28. CLOSING TIME |
|---|---|---|---|---|
| A1 | ○ | XX/XX/XX XX:XX | — | — |
| A2 | — | — | ○ | XX/XX/XX XX:XX |
| B1 | ○ | XX/XX/XX XX:XX | — | — |
| B2 | — | — | ○ | XX/XX/XX XX:XX |
| B3 | ○ | XX/XX/XX XX:XX | — | — |
| B4 | — | — | ○ | XX/XX/XX XX:XX |
| C1 | — | — | ○ | XX/XX/XX XX:XX |
| C2 | ○ | XX/XX/XX XX:XX | — | — |
| D1 | — | — | ○ | XX/XX/XX XX:XX |
| D2 | ○ | XX/XX/XX XX:XX | — | — |
| D3 | — | — | ○ | XX/XX/XX XX:XX |
| D4 | ○ | XX/XX/XX XX:XX | — | — |

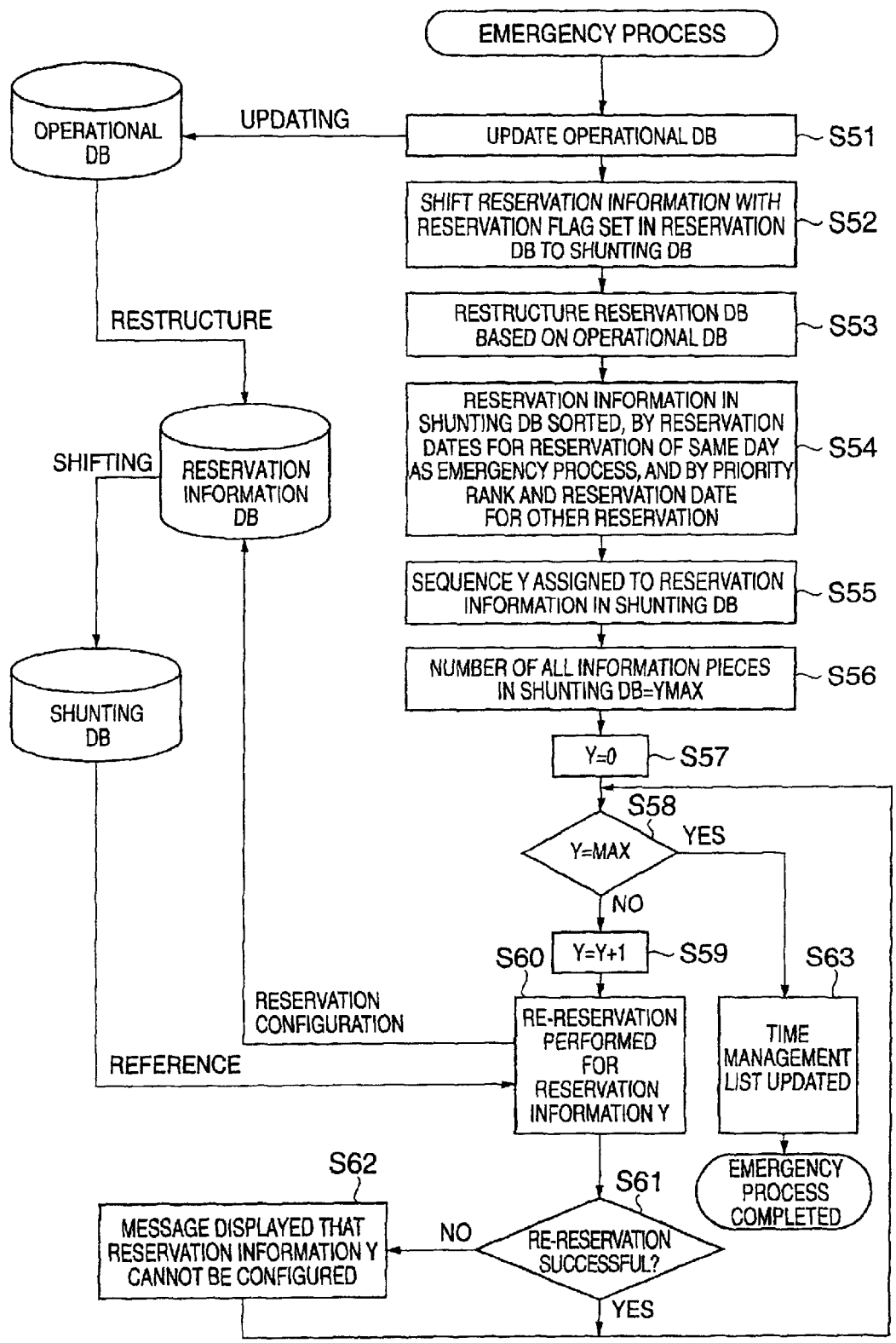

NETWORK CONFIGURATION CONTROL METHOD AND NETWORK CONFIGURATION CONTROL UNIT

This application is a continuation of international application number PCT JP99/05371 filed Sep. 30, 1999.

BACKGROUND OF THE INVENTION

1. Field of the Invention

This invention relates to a network configuration control method and a network configuration control unit, and specifically relates to the network configuration control method and the network configuration control unit that realize network configuration by reservation.

2. Description of the Related Art

In order to configure a network by reservation, operation of network transmission apparatuses have to be controlled based on a reservation process. In order to configure the operation of a network transmission apparatus, the apparatus was directly operated manually in earlier days. Later, an operation system emerged, which supervises and controls the apparatus efficiently, and the apparatus can now be configured by a screen operation from a remote place.

Relations between network composition and a path and a circuit are shown in FIG. 1, which provide a basis for an understanding of descriptions that will follow. We shall consider an example wherein subscribers T of Tokyo (starting point) 30, and subscribers O of Osaka (terminal point) 37 are connected by a circuit. The subscribers T and the subscribers O are connected to transmission apparatuses (NE) 31 and 36, respectively, via a circuit 38 to adjacent telephone offices T and O, respectively. There are many telephone offices (for example, xx through xx) in the network, each of which has a transmission apparatus (NE), similar to the telephone offices T and O, for structuring a circuit. The telephone offices are connected by a path. Here, the path is a collection of circuits (it can also be called a bundle of circuits). A connection between the subscribers T and the subscribers O is established by accommodating the circuit 38 into a path at the telephone office T and the telephone office O, and by connecting the telephone offices T and O by a path via a number of other telephone offices (xx through xx). Further, FIG. 1 can also be regarded as showing a common carrier leased line which accommodates a plurality of circuits laid between the telephone office T and the telephone office O. In this manner, the subscribers T and the subscribers O mutually communicate using one of the common carrier leased lines.

FIG. 2 is a drawing for explaining configuration to accommodate a path and a circuit. In order to accommodate the circuit in the path, 3 configurations are performed, namely, (1) deciding a user's service item at an accommodating office, wherein, the user's service item means bandwidth (64 kbps, 2 Mbps, etc.) and the like that the subscriber uses, (2) deciding on which path the circuit is to be accommodated among paths connected to the accommodating office, and (3) performing the similar configuration in each telephone office that is included such that a required network is established by connecting paths connected to the accommodating office and the included offices that relay a communication.

Here, such configuration of a path and a circuit as above is called an "opening". Another configuration is a "closing". The "closing" is the opposite of the "opening", that is, an opened network is returned to an initial status. Further, a duration while a network is open is called "in operation", and a duration while the network is closed is called "not in operation".

FIG. 3 shows an outline of a system for configuration control, which performs openings and closings on a network. A plurality of telephone offices and a plurality of transmission apparatuses 9 are connected between the telephone office T and the telephone office O. Each transmission apparatus 9 is equipped with an NE-DB which is an operational database into which configuration information on the transmission apparatus is stored. Further, a configuration control system of each office includes an operational DB10 that stores information about all NE-DBs of the office. According to contents of the operational DB10, the NE-DB in each transmission apparatus is modified to configure that transmission apparatus.

Here, instead of each transmission apparatus 9 being equipped with the configuration control system, a system may be structured such that one control system centrally controls the plurality of the transmission apparatuses 9 between the office T and the office O as a group.

In the telephone office T and the telephone office O, a path-circuit configuration direction means $7_T$ and $7_O$, respectively, outputs a configuration direction of a path and a circuit. Operational DB $10_T$ and $10_O$ are updated according to the direction. Information stored in the operational DB $10_T$ and $10_O$ is immediately reflected to the NE-DB in the appropriate transmission apparatuses, and a network is configured.

However, since the network configuration is reflected to the network immediately after the configuration is provided to the operational DB, there is a problem that a vast amount of work is concentrated just before time to configure, in the case where a major configuration process has to be carried out.

In order to eliminate the vast amount of work required at time of configuration, a configuration control system that beforehand reserves contents of a configuration beforehand has been developed.

FIG. 4 shows a conventional configuration control system that performs using a reservation process. FIG. 4 includes offices 1 and 2, an operational database (operational DB) 10, a reservation information database (reservation information DB) 11, a time determining processing means 16, a reservation processing means 17, and a reservation directing means 18. Transmission apparatuses (NE $15_1$ and $15_2$) are provided in the office 1 as an example.

The operational DB 10 stores configuration information about network operations. A circuit and a path of the transmission apparatus are configured based on this configuration information. The reservation information DB 11 stores reservation information. The time determining processing means 16 checks reservation times and when a reservation time is reached, it performs the required processing to effect changes in network configuration. The reservation processing means 17 is a means to create reservations. The reservation directing means 18 directs contents of reservations to appropriate DBs. The NE $15_1$ and $15_2$ are transmission apparatuses at which a reservation is targeted.

As shown in the drawing, the configuration information that is to be used for network operations is set up in the reservation information DB 11 by the reservation processing means 17, which is then included in the contents of the directions that the reservation directing means 18 outputs. When the time determining processing means 16 determines that the reservation time has arrived, configuration contents stored in the reservation information DB 11 are provided to the operational DB10. Information provided to the operational DB10 is reflected as it is to the NE $15_1$ and NE $15_2$.

The conventional technology is explained using FIG. 5. The structure of the reservation of the conventional technology is as follows.

An opening reservation is accepted in the reservation information DB 11 when a route between a starting point and a terminal point is not in operation nor already reserved for opening as of the time of the opening reservation.

Further, a closing reservation is accepted in the reservation information DB 11 when a route between the starting point and the terminal point is in operation, or already reserved for opening. In the case of the closing reservation of a reserved opening, a check is performed to ascertain that the closing will take effect after the opening.

In FIG. 5A, examples are presented of a path in operation (B1-B2-A3-C4) and paths under opening reservation (C1–C2 and B3–B4) at time T.

Here, suppose that an opening reservation as shown in FIG. 5B (A1-A2-C3-A4) is scheduled for time T+α. The opening reservation is accepted because, as seen from FIG. 5A and FIG. 5B, the path A1-A2-C3-C4 for the opening reservation is not in operation nor already reserved at the time T.

Further, in FIG. 5, a closing reservation with path B1-B2-A3-A4 is accepted unconditionally. A closing reservation with path C1-C2-B3-B4 is accepted only when time to close is after the time T+α.

Now, the opening reservation of A1-A2-C3-A4 is to be performed (FIG. 5B). An operator gives the reservation processing means 17 information about the starting point, the terminal point, and reservation time using the reservation directing means 18. As the drawing shows, the reservation time T+α, and the three pieces of information, namely the starting points and the terminal points, "A1 and A2", "A2 and C3" and "C3 and A4", respectively, are provided, thereby the opening reservation of A1 through A4 is created. The reservation processing means 17 checks whether paths between each of the starting point and each of the terminal point of the three reservations are available, that is, not in operation nor already reserved, making a reference to the reservation information DB 11. If the check was affirmative, the new reservation is added to DB 11. If the check was negative, the opening reservation of A1-A2-C3-A4 is not added to DB 11. Further, in the case where a closing reservation is processed for a certain starting point through a terminal point, the reservation processing means 17 makes a reference to the reservation information DB 11 to determine that the starting point through the terminal point is either in operation or already reserved for opening before adding the closing reservation. In the case of an existing opening reservation, a check is performed to ascertain that the closing will take place after the opening.

Thus, the conventional technology stores a configuration beforehand and performs processing at a desired time. However, a problem is that a new reservation for a near future is rejected if there is an opening/closing reservation of a given network section already set up for a far future, even if the new reservation would be acceptable.

For example, if a path as shown in FIG. 6A has been reserved between the telephone offices O and T (reservation time T4), and if opening and closing of a path between the telephone offices Y and T has been reserved for a period between T2 and T3 as shown in FIG. 6B, a reservation of a path for part or all of sections between the telephone office O and T for a time period from a present time T1 to a time T2 is not allowed.

This problem denies the effective use of resources by a communication carrier.

To avert this problem, it is conceived that a first reservation is temporarily cancelled, a near future reservation is performed, and upon completion of the near future reservation, the first reservation is restored. However, this causes a problem in that it is troublesome and inefficient.

Further, since the conventional technology does not provide a means to take a change in operational situations into account regarding reservation management when emergency configuration work is performed without regard to reservations, a problem is that an error may occur in reservations that follow.

SUMMARY OF INVENTION

The present invention is made to solve problems of the conventional technology mentioned above, and aims at providing a system that uses resources, such as a path and a circuit, as effectively as possible, and carries out emergency configuration without canceling existing reservations.

FIG. 7 is a diagram showing the principle of the present invention.

FIG. 7 includes offices 1 and 2, an operational database (operational DB) 10, a reservation information database (reservation information DB) 11, a shunting database (shunting DB) 12, a time management list 14, a time determining processing means 16, a reservation processing means 17, and a reservation direction means 18. Transmission apparatuses (NE $15_1$ and NE $15_2$) are provided in the office 1 as an example.

The operational DB10 stores operational configuration information. The operational DB10 stores only the information contained in configuration section 24, as shown in FIG. 8. Here, the configuration section 24 contains route information from a starting point to a terminal point.

The reservation information DB 11 is generated from the operational DB 10 with only the addition of an operation flag 22, when there are no reservations, as shown in FIG. 9. As regards the operation flag 22, "O" (the flag is on) is displayed if the configuration section 24 is in operation, and "-" (the flag is not set) is displayed if it is not in operation.

When a reservation is performed, as shown in FIG. 10 through FIG. 13, a reservation number 20, a reservation date 21, a reservation flag 23, an opening flag 25, an opening time 26, a closing flag 27, a closing time 28, and a priority rank 29 are added. The reservation number 20 is a number uniquely assigned to the reservation information DB 11, and realizes efficient use of the time management list 14 as described hereunder.

FIG. 10 shows the content of the reservation information DB wherein opening reservations with no period specified are set (reservations A1 and B3), and FIG. 11 shows the content of the reservation information DB wherein opening reservations with a specified period are set (reservations A1–A2 and B3–B4). FIG. 12 shows the content of the reservation information DB wherein closing reservations with no period specified are set (reservations C1 and D3), and FIG. 13 shows the content of the reservation information DB wherein closing reservations with a period specified are set (reservations C1–C2 and D3–D4).

Further, the reservation date 21 in the reservation information DB is a date on which the reservation is performed. "O" is displayed in the opening flag 25 when an opening reservation is made, and "-" is displayed when the entry is not an opening reservation reservation. The opening time 26 indicates time and date at which the opening should be performed. The closing flag 27 and the closing time 28 have closing functions similar to the opening flag 25 and the opening time 26 in the case of opening, respectively. The priority rank 29 is for giving precedence to each reservation. It is used as a criterion of priority of the reservation information when an emergency process and a reservation cancellation are performed.

Further, synchronization between the reservation information DB 11 and the operational DB 10 that generates the DB 11 is performed arbitrarily or on a schedule.

As shown in FIG. 14, the shunting DB 12 is structured in the same form as the reservation information DB 11, and serves as a temporary storing area for the reservation information DB 11.

As shown in FIG. 15, the time management list 14 is generated by extracting the reservation number 20, the opening flag 25, the opening time 26, the closing flag 27, and the closing time 28 from the reservation information for which the reservation flag 23 is set (state of "O") in the reservation information DB 11. The time management list is sorted in time sequence. Every time a configuration reservation is performed, the time management list 14 is updated.

The NE $15_1$ and NE $15_2$ (transmission apparatuses) shown in FIG. 4 are the transmission apparatuses targeted for reservation.

An outline of NE 15 relative to configuration is shown in FIG. 16. Each NE 15 includes an NE-A and an NE-B which are provided with an NE-DB $9_A$ and $9_B$, respectively, storing connection information about the NE. For example, NE-DB $9_A$ in NE-A of FIG. 16, pieces of information stored are "Opening of A and E is impossible", "Opening of B is possible", "C, D and F are in operation" and "C and D are connected within NE1". Here, "in operation" indicates a state that is already opened, "impossible" indicates a state that is not physically connectable, and "possible" indicates a state that is available for opening (physically connected but not opened).

As described in detail in the following with reference to attached drawings, this invention realizes reservations which can utilize resources, such as a path and a circuit, as efficiently as possible, further carrying out the reservation without canceling reservations already stored, even when an emergency configuration change is performed, by (1) performing a simultaneous reservation for opening and closing of a network, if it is not opened for traffic at opening time 26 and if there is no reservation in the same configuration section between a period from opening and closing, (2) performing a simultaneous reservation for closing and opening of a network, if it is opened for traffic at closing time 28 and if there is no reservation in the same configuration section in a period from closing to opening, (3) canceling a network reservation, if there is no other reservation for the same configuration section at a reservation time after the reservation time of the reservation to be cancelled, or if there is another reservation for the same configuration, the other reservation having a reservation time immediately after the reservation time of the reservation to cancel, may be cancelled, and (4) performing an emergency network configuration with no regard to existing reservations, while the existing reservations are shunted, making the reservation information database 11 that stores reservation information empty, and the shunted reservation information DB 12 is used to restore the existing reservations after the emergency configuration is set up.

BRIEF DESCRIPTION OF THE DRAWINGS

Other objects, features, and advantages of this invention will become clearer by reading the following explanations, referring to attached drawings.

FIGS. 5A and 5B are drawings for explaining a structure of reservation in the conventional technology.

FIG. 10 shows the contents of the reservation information DB including opening reservations with no specified period set.

FIG. 11 shows the contents of the reservation information DB including opening reservations with a specified period set.

FIG. 12 shows the contents of the reservation information DB including closing reservations with no specified period set.

FIG. 13 shows the contents of the reservation information DB including closing reservations with a specified period set.

FIG. 14 shows the contents of a shunting DB to which the reservation information DB contents have been shifted.

FIG. 15 is a table for explaining a time management list.

FIG. 22 is a flowchart of an emergency process.

DESCRIPTION OF THE PREFERRED EMBODIMENTS

Figure 1:
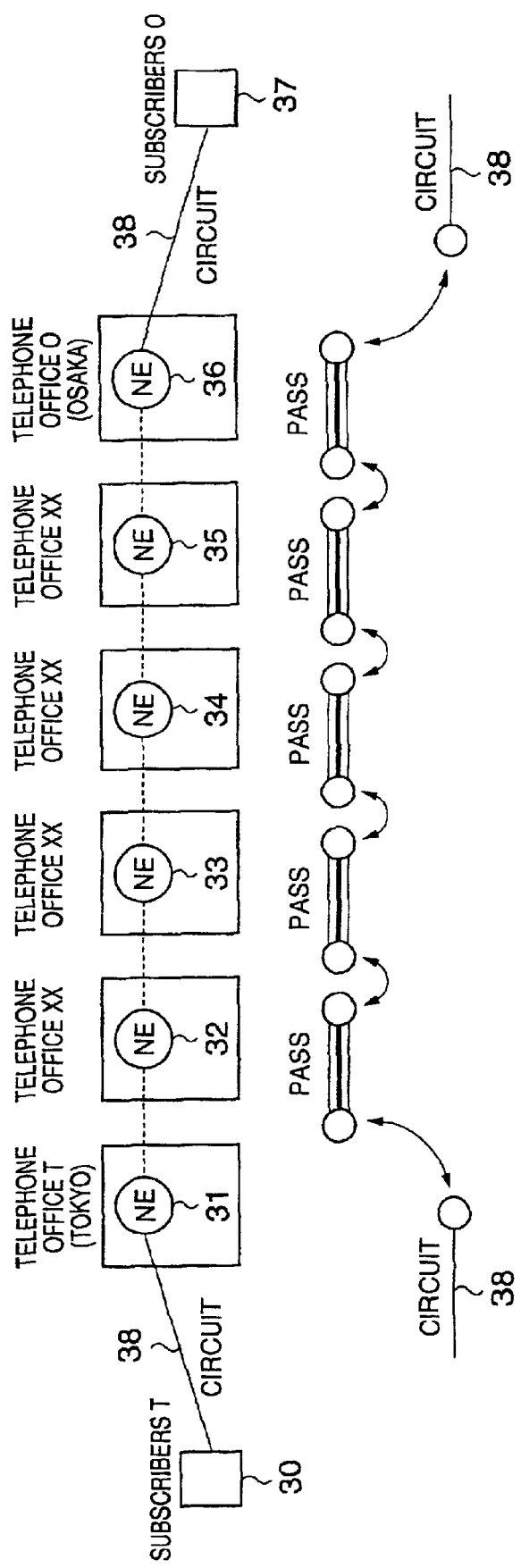
FIG. 1 is a drawing for explaining a network composition, and a relation between a path and a circuit.
Figure 2:
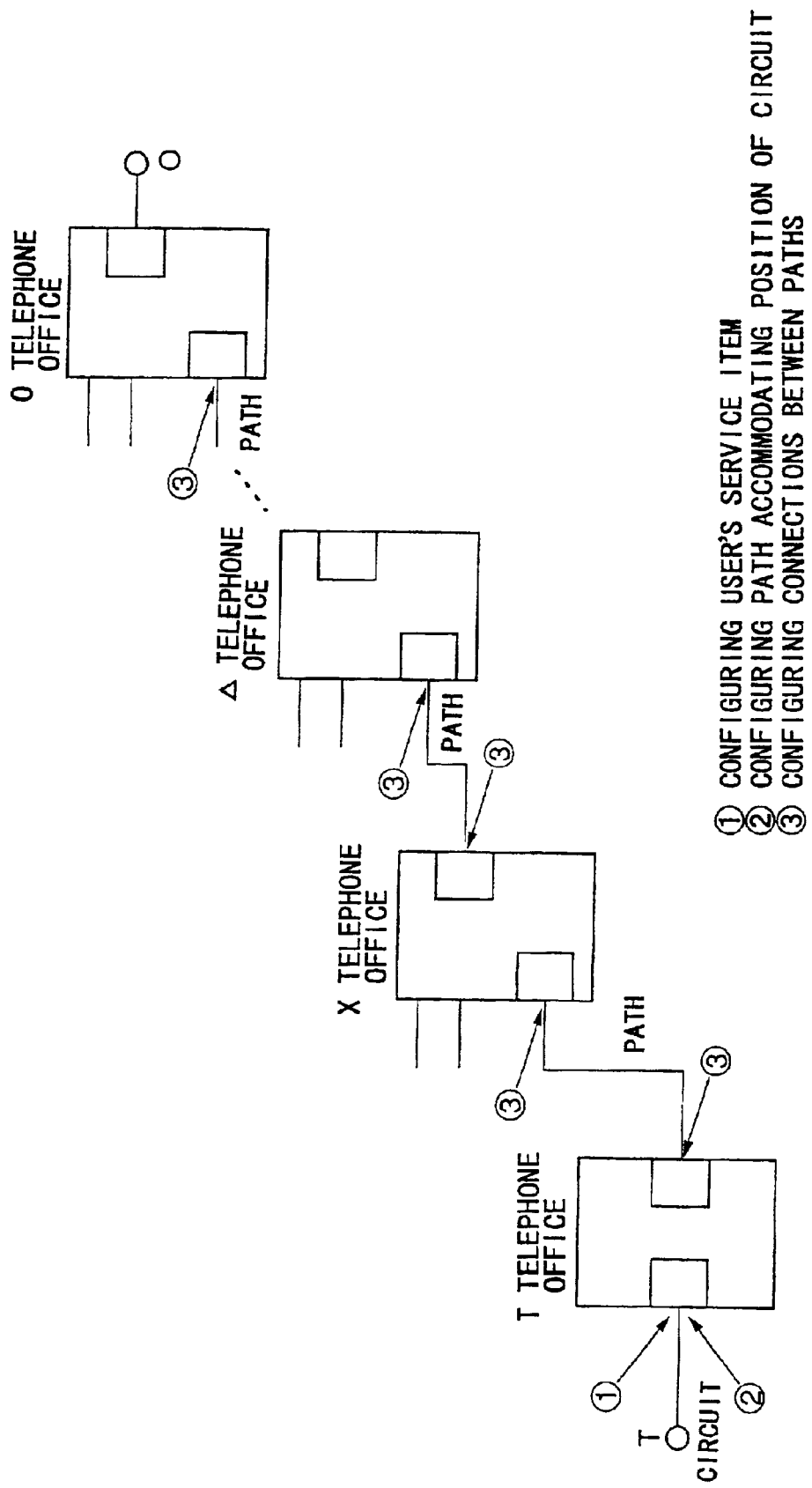
FIG. 2 is a drawing for explaining a configuration to accommodate a path and a circuit in a network.
Figure 3:
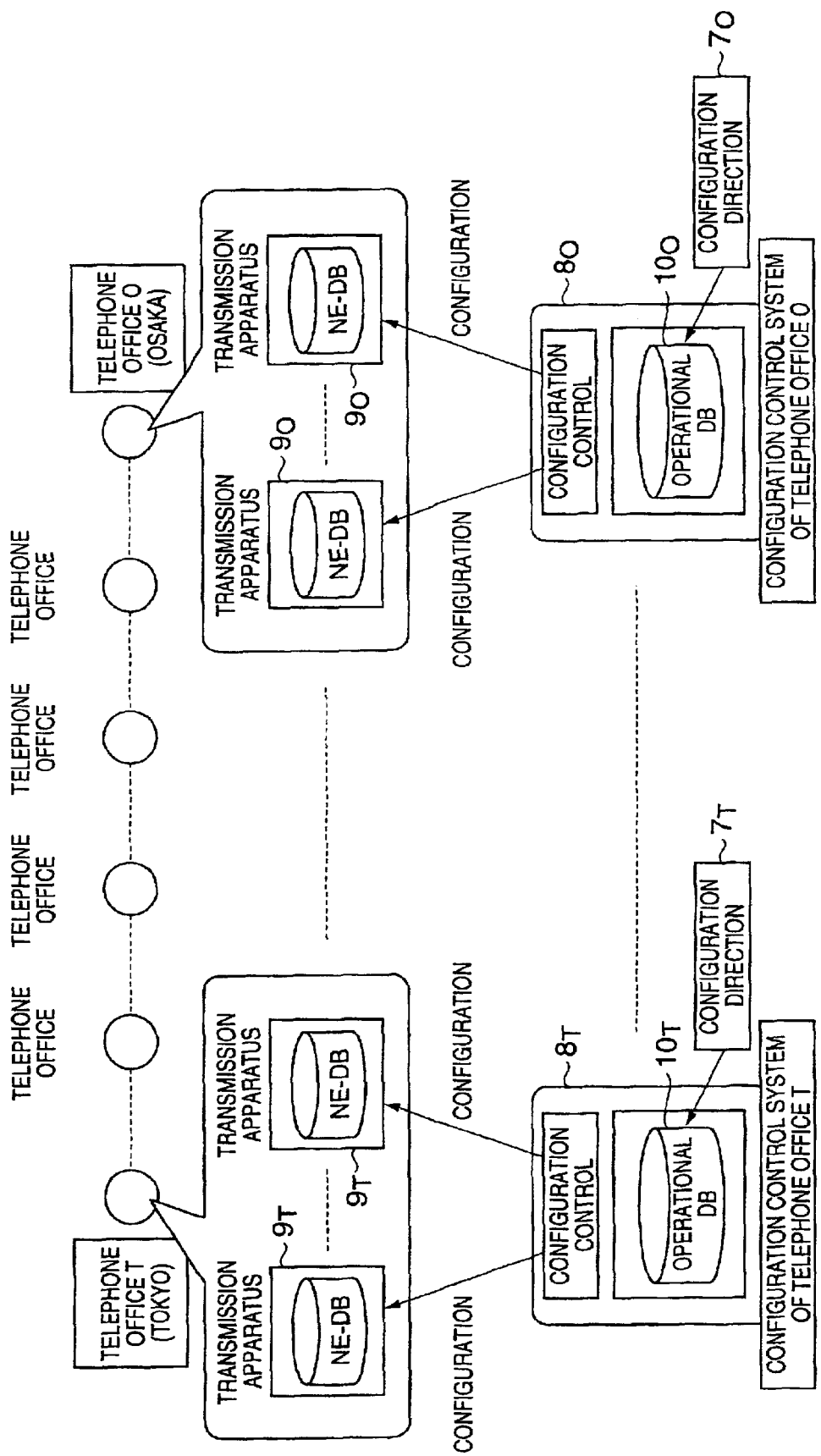
FIG. 3 is a drawing for explaining a configuration control system.
Figure 4:
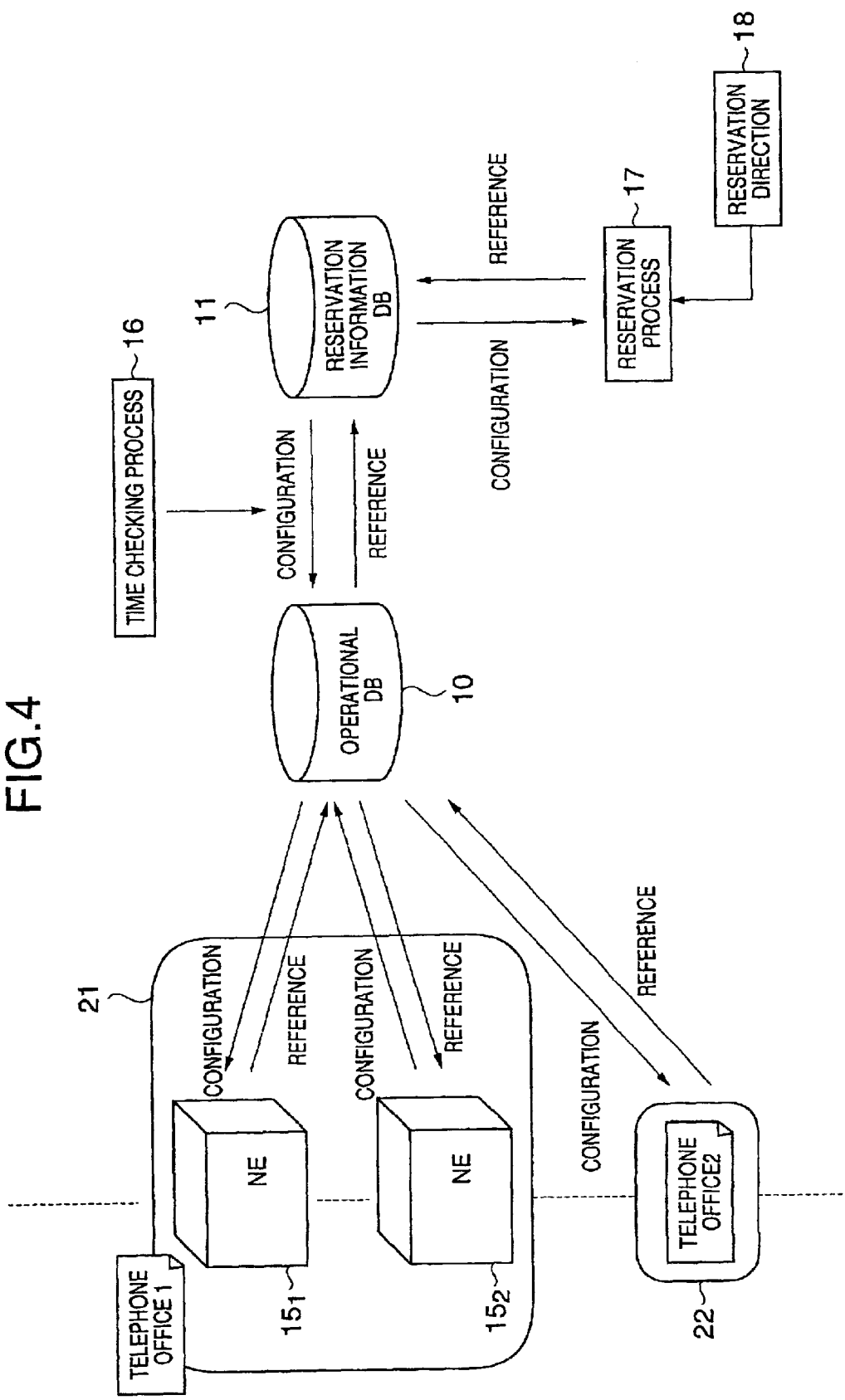
FIG. 4 is a drawing for explaining the conventional technology.
Figure 6A:
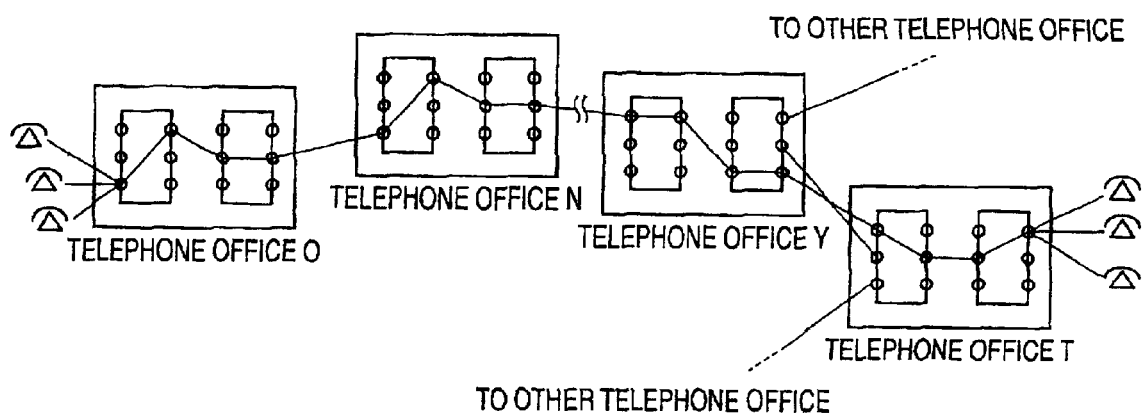
FIGS. 6A and 6B are drawings for explaining a problem of the conventional technology.
Figure 6B:
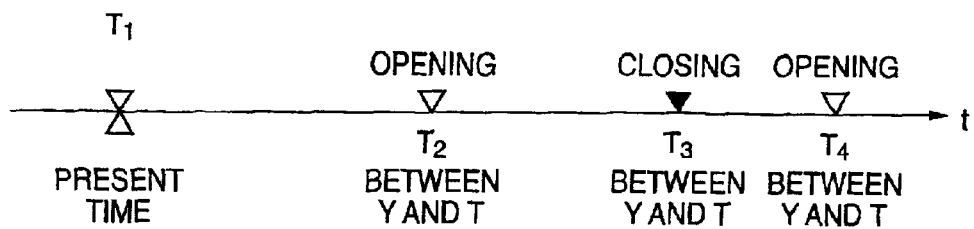
Figure 7:
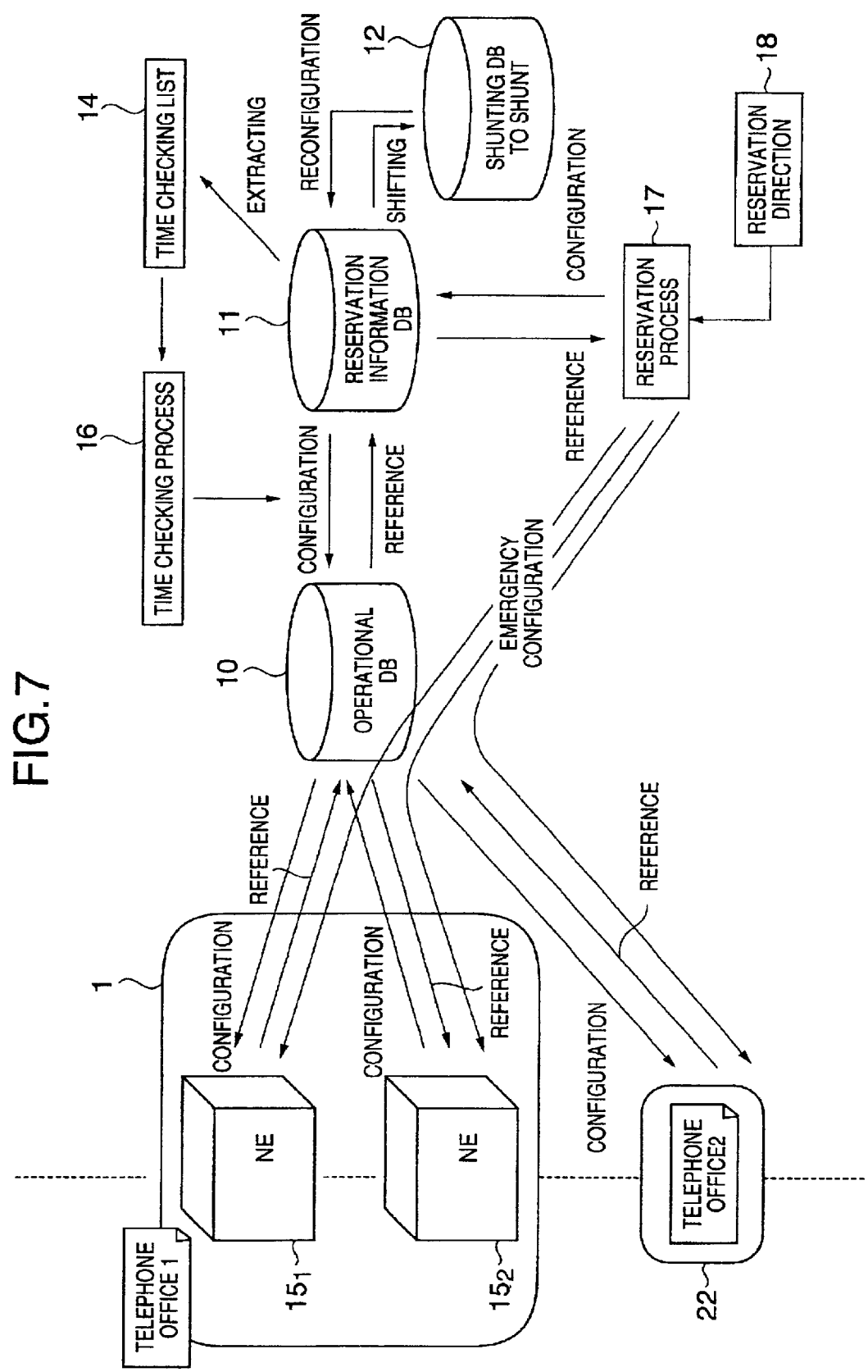
FIG. 7 is a diagram for explaining the principle of this invention.
Figures 8, 9:
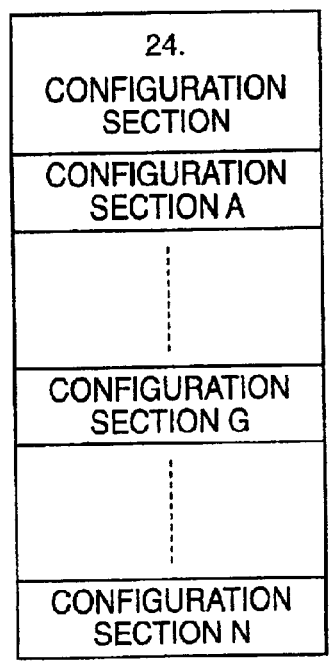
FIG. 8 is a drawing for explaining contents of an operational DB.
FIG. 9 is a drawing for explaining contents of a reservation information DB.
Figure 16:
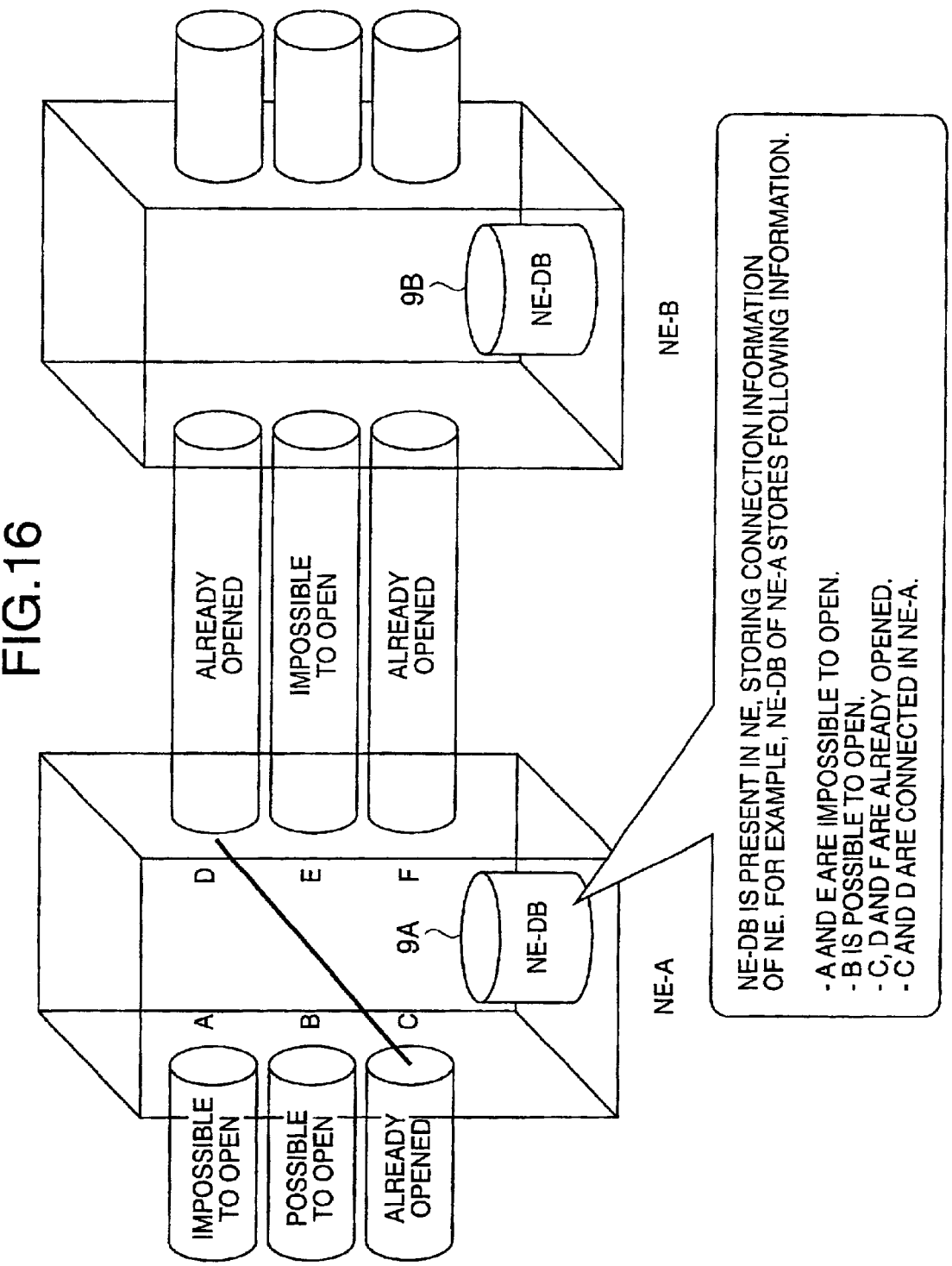
FIG. 16 is a drawing for explaining an outline of a transmission apparatus NE relative to configuration.

In the following, an embodiment of this invention is explained, using FIG. 7 that is a diagram of the principle of this invention, as described above.

In the present invention, first, a reservation information DB 11 is generated by adding an operation flag 22 to the contents of an operational DB 10 as the initial configuration to perform reservations.

After this initialization, two kinds of reservation, opening reservation and closing reservation, can be performed.

In the case of an opening reservation, inputs of a starting point, a terminal point, opening time 26, and a priority rank 29 are required. Further, in the case of a closing reservation, inputs of a starting point, a terminal point, closing time 28, and a priority rank 29 are needed.

Figure 17:
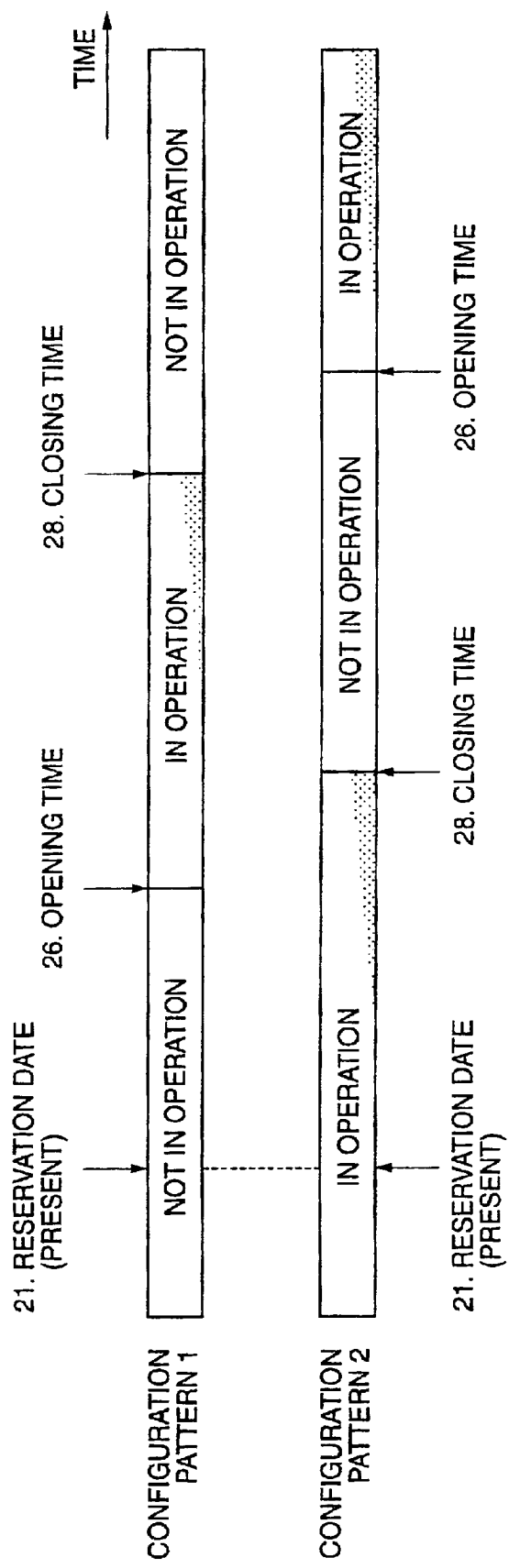
FIG. 17 is a drawing for explaining a reservation date/opening time/closing time.

A relation between a reservation date 21, the opening time 26, and the closing time 28 is shown in FIG. 17. The reservation date 21 indicates a date and time on which a reservation is registered. Further, the opening time 26 indicates a date and time when the opening is actually to take place, and the closing time 28 is a date and time when the closing is actually to be carried out.

As shown in a configuration pattern 1 of FIG. 17, only an opening reservation can be performed at first when reserving in a part of the network that is not in operation. Then, in the case of performing a closing reservation, closing time has to be always later than opening time.

Further, as shown in a configuration pattern 2 of FIG. 17, only a closing reservation can be performed at first when reserving in a part of the network that is in operation. Then, in the case of carrying out an opening reservation, opening time has to be always later than closing time.

In the following, an opening reservation, a closing reservation, a configuration, a reservation cancellation process, and an emergency process are described.

(Opening Reservation)

A prerequisite for performing an opening reservation is that a configuration section 24 (see FIG. 10) is not in operation at the opening time 26.

Figure 18:
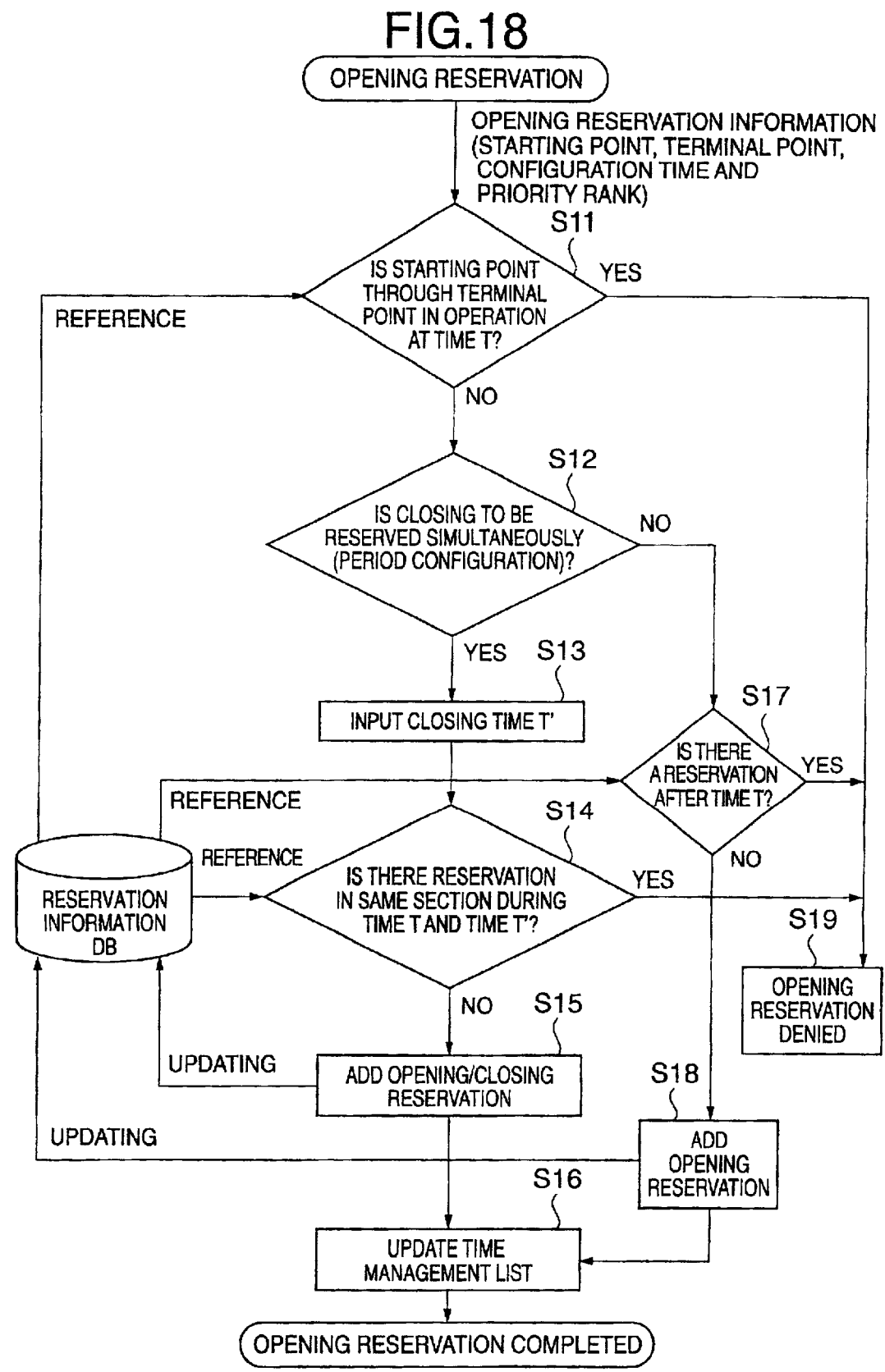
FIG. 18 is a flowchart of an opening reservation.

The flowchart of an opening reservation is shown in FIG. 18.

In the case of an opening reservation, first, a check is made as to whether the configuration section 24 (route information) is in operation at the opening time 26 with reference to the reservation information DB 11 (S11). If it is in operation, the opening reservation shall be denied (S19). If it is not in operation, a further check is made as to whether a closing reservation shall be performed simultaneously (period to be specified) (S12). In the case that the closing reservation is not performed (S12:N), only when there is no reservation of the same configuration section 24 after the opening time 26 (S17:N), is the opening added to the reservation information DB 11 (S18). In the case that the closing reservation is performed (S12:Y), an input of the closing time 28 is required of an operator (S13). If there is no reservation of the same configuration section 24 between the opening time 26 and the closing time 28 (S14:N), the opening reservation and the closing reservation will be added to the reservation information DB 11 (S15).

FIG. 10 shows contents of the reservation information DB 11 in the case that an opening reservation was performed with a period specified. FIG. 10 shows contents of the reservation information DB 11 in the case that an opening reservation was performed with no period specified. Specifically, the reservation number 20, the reservation date 21, the reservation flag 23, the configuration section 24, the opening flag 25, the opening time 26, and the priority rank 29 are written into the reservation information DB 11. In the case of configuration with a period specified, the closing flag 27 and the closing time 28 are further written into the reservation information DB 11.

When writing to the reservation information DB 11 is completed, the time management list 14 is updated (S16).

(Closing Reservation)

A prerequisite for performing a closing reservation is that the configuration section 24 is in operation at the closing time 28.

Figure 19:
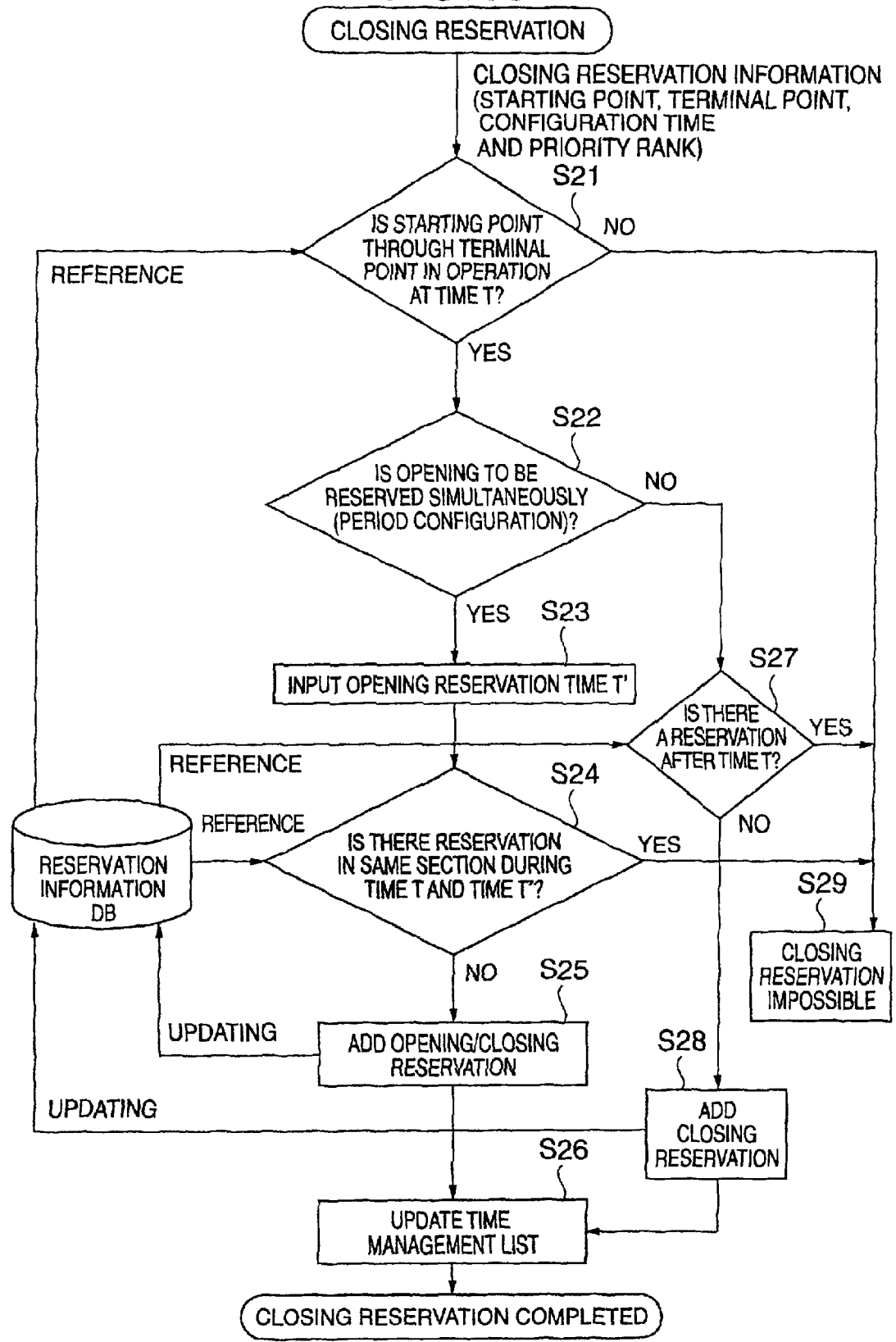
FIG. 19 is a flowchart of a closing reservation.

A flowchart of closing reservation is shown in FIG. 19.

In the case of closing reservation, first, a check is made as to whether the configuration section 24 is in operation at the closing time 28 with reference to the reservation information DB 11 (S21). Closing reservation will be denied if it is not in operation (S29). If in operation, whether or not an opening reservation shall be performed simultaneously (set up with a period specified) is checked (S22). If the reservation is without a period specified (S22:N), so long as there is no reservation of the same configuration section 24 after the closing time 28, the reservation is added to the reservation information DB 11 (S28). If the reservation is with a period specified (S22:Y), an input of opening time 26 is required of an operator (S23). If there is no reservation at the configuration section 24 during a period between the closing time 28 and the opening time 26 (S24:N), both the closing reservation and the opening reservation are added to the reservation information DB 11 (S25).

FIG. 12 shows the contents of the reservation information DB 11 in the case that a closing reservation was performed with no period specified. FIG. 13 shows the contents of the reservation information DB 11 in the case that a closing reservation was performed with a period specified.

Specifically, the reservation number 20, the reservation date 21, the reservation flag 23, the configuration section 24, the closing flag 27, the closing time 28, and the priority rank 29 are written into the reservation information DB 11. In the case of a configuration with a period specified, the opening flag 25 and the opening time 26 are further written into the reservation information DB 11.

When writing to the reservation information DB 11 is completed, the time management list 14 is updated (S26).

(Configuration)

The reservation information reserved as above is reflected to a network as follows.

Figure 20:
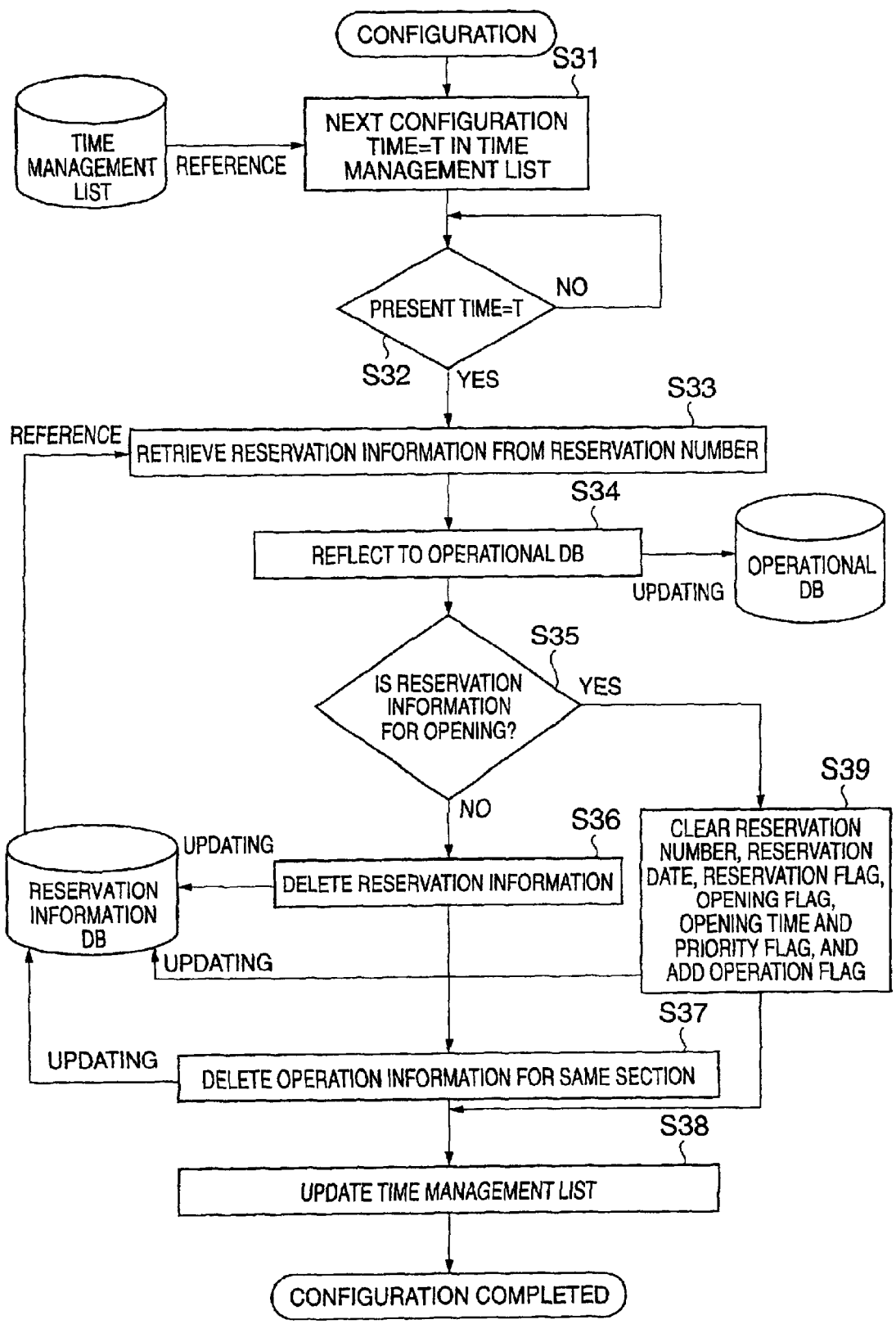
FIG. 20 is a flowchart of a configuration.

A flowchart of a configuration process is shown in FIG. 20.

If there is a reservation in the time management list 14, at opening time 26 or closing time 28 whichever arrives (S31, S32), reservation information is retrieved from the reservation information DB 11 (S33) with the reservation number used as a trigger, and is reflected to an operational DB10 (S34). The reservation information reflected to the operational DB10 is immediately set in an NE 15 (see FIG. 7).

Subsequent processing differs depending on whether the reservation is an opening reservation or a closing reservation.

First, if it is an opening reservation, (S35:Y), the reservation number 20, the reservation date 21, the reservation flag 23, the opening flag 25, the opening time 26, and the priority rank 29 are cleared, then, the operation flag 22 is attached, and the reservation information is updated.

If it is a closing reservation (S35:N), the reservation information is deleted from the reservation information DB 11 (S36), and operational information relative to the configuration section 24 is also deleted (S37).

When updating of the reservation information is completed, the time management list 14 is updated (S38).

(Reservation Cancellation Process)

It is conceivable that a situation may arise where a change in reservation contents must be implemented due to a change in a planned network operations or due to an error in reservation configuration. In that case, the reservation contents to be corrected shall be cancelled through a reservation cancellation process described hereunder, and, if required, a new reservation (opening reservation/closing reservation) shall be performed.

Figure 21:
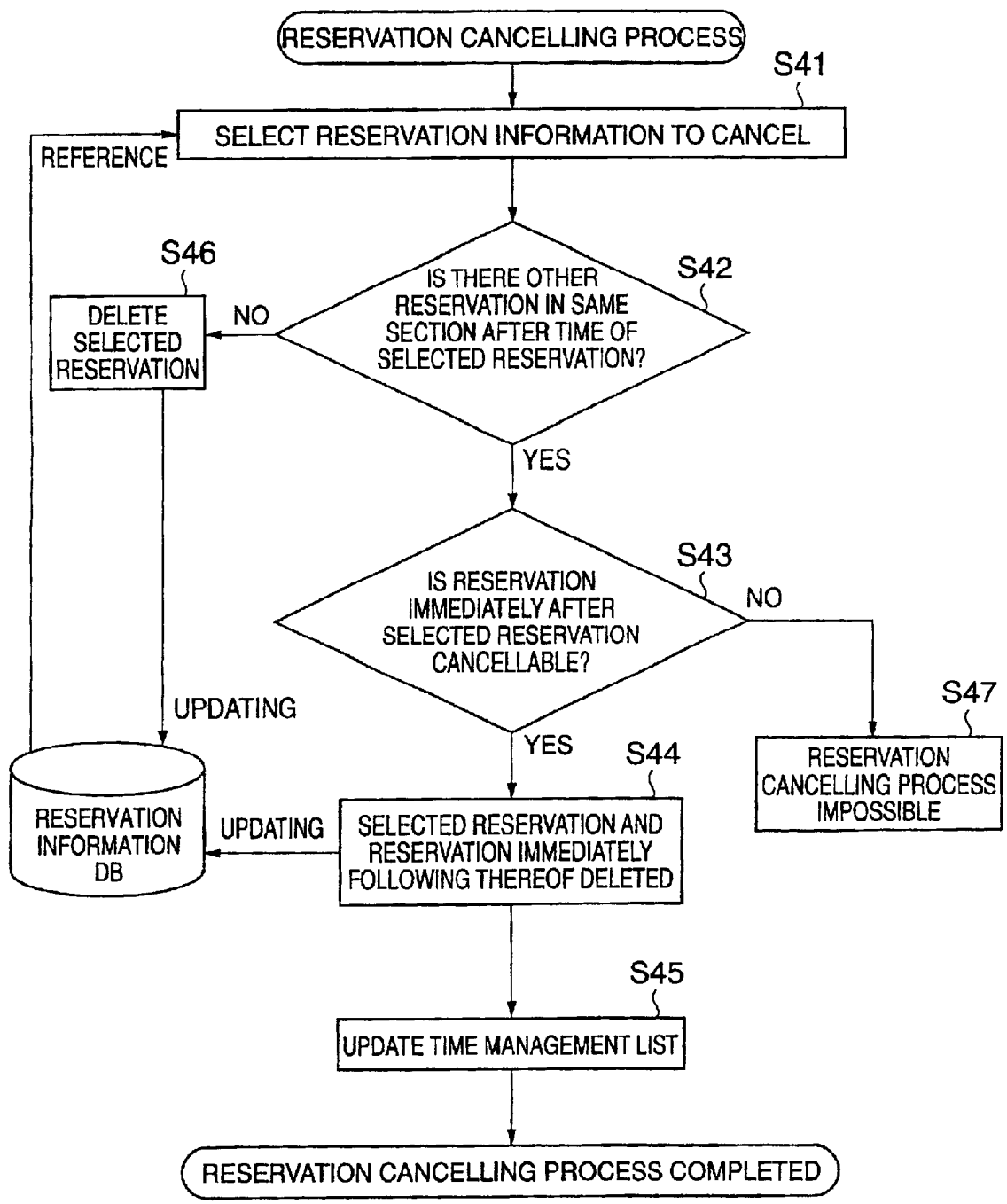
FIG. 21 is a flowchart of a reservation cancellation process.

A flowchart of the reservation cancellation process is shown in FIG. 21.

First, the reservation cancellation process selects a reservation to cancel from the reservation information DB 11 (S41). If there is no reservation of the same configuration section 24 after time set up by the selected reservation (S42:N), the selected reservation is deleted from the reservation information DB 11 (S46).

When there is a reservation of the same configuration section 24 after the configuration time of the selected reservation (S42:Y), an inquiry is made to an operator asking whether the reservation following immediately may be simultaneously deleted (S43). If it should not be deleted (S43:N), the reservation cancellation is cancelled (S47). Otherwise, a conflict of reservations will arise, such as an opening reservation after an opening reservation, and a closing reservation after a closing reservation (conflict of consecutive reservations of the same type).

If a direction was that it might be deleted (S43:Y), the selected reservation and the reservation immediately following are deleted from the reservation information DB 11 (S44).

When updating of the reservation information DB 11 is completed, the time management list 14 is updated (S45).

(Emergency Process)

If a fault occurs at one of the transmission apparatuses, a path and a circuit to bypass the faulty section have to be established such that a circuit in trouble is immediately placed. A section that places the troubled section will continue to be employed even after the section in trouble is restored, in order to avoid a temporary halt of the circuit again. Because of this, paths and circuits that have been planned in advance according to reservations may be affected.

After completing an emergency configuration, an emergency process then shunts all reservation information and performs reservations once again in accordance with the priority attached.

The flowchart of the emergency process is shown in FIG. 22.

At the time of the emergency process, the reservation information in the reservation information DB 11 managed by the time management list 14 is disregarded, and priority is given to the emergency process.

First, the operational DB 10 is directly accessed, and configuration by the emergency process is reflected to the network (S51). Next, pieces of the reservation information with the reservation flag 23 set in the reservation information DB 11 are shifted to the shunting DB 12 (S52).

Next, the reservation information DB 11 is updated with reference to the operational DB10 that has reflected the emergency process (S53).

Then, the original reservation information, which has been moved to the shunting DB 12, is sorted in the following order.

First, reservation information entries that bear the same day in the opening time 26 and the closing time 28 as the day of the emergency process are sorted in the order of the reservation date 21, and are assigned with Y as a sequence (Y=1 through W) (S54, S55).

Then, the remaining entries of the reservation information in the shunting DB 12 are sorted by a first key of the priority rank 29, and a second key of the reservation date 21. A sequence that follows the previous sequence Y is assigned (Y=W+1 through YY). In the case that the number of entries of the reservation information in the shunting DB 12 is YMAX, the sequence will be Y=1 through YMAX.

Then, whether re-reservation can be performed for Y=1 through YMAX in sequence is checked (S58, S59, S60, and S61).

The checking of re-reservations is the same as the procedure for making reservations for new opening reservation and closing reservation. However, when a piece of the reservation information cannot be processed for re-reservation, a message of being unable to configure is displayed (S62).

When the re-reservation process is completed up to the reservation information YMAX in the shunting DB 12, the time management list 14 is updated (S63).

As described above, according to this invention, resources, such as a path and a circuit, can be used relative to reservation of a network configuration as effectively as possible. Further, an emergency task can be carried out without canceling reservations already stored. Therefore, the invention contributes significantly to the decentralization and efficiency of configuration tasks that include reservations in the network configuration.

In addition, the present invention is not limited to the embodiment specifically described, but various modifications and embodiments can be considered, without deviating from the range of the present invention claimed.

What is claimed is:

1. A network configuration control method for use in a network that is formed by transmission apparatuses that are connected via communication paths, wherein simultaneous reservation of opening and closing for a given section; of the network is made if:

the given section of the network will not be in operation a time of the opening, a time of the closing is later than the time of the opening, and there is no previous reservation in the given section between the opening time and the closing time.

2. A network configuration control method for use in a network that is formed by transmission apparatuses that are connected via communication paths, wherein simultaneous reservation of opening and closing for a given section of the network is made if:

a given section of the network will be in operation at a time of the closing, a time of the opening is later than the time of the closing, and there is no previous reservation of the given section between the time of the closing and the time of the opening.

3. A network configuration control method for use in a network that is formed by transmission apparatuses that are connected via communications paths, comprising the steps of:

storing reservation information and a reservation number corresponding to the reservation information into a reservation information database, listing a set-up time of a reservation and a reservation number corresponding to the reservation into a time management list, and retrieving the reservation information from the reservation information database using the reservation number corresponding to a time of reservation in the time management list as a key to when the time of reservation will arrive to configure a given section of the network on the basis of the reservation information.

4. A network configuration control method for use in a network that is formed by transmission apparatuses that are connected via communication paths, wherein cancellation of a reservation of opening or closing for a given section is carried out if there is no previous reservation of the given section after a reservation time of the reservation to be cancelled, or a previous reservation of the given section after the reservation time of the reservation to be cancelled exists, and if cancellation of the previous reservation is acceptable.

5. A network configuration control method for use in a network that is formed by transmission apparatuses that are connected via communications paths, and for configuring a given section of the network in an emergency to a network configuration status, comprising the steps of:

configuring the given section of the network to the network configuration status regardless of reservation information already reserved, saving the reservation information stored in a reservation information database to a saving storage so as to vacate the reservation information database, when an emergency network configuration is performed, and restoring reservations for the network configuration status based on the reservation information saved in the saving storage.

6. The network configuration control information as claimed in claim 5, wherein the restoring of the reservations is performed preferentially, starting with reservations on the day which the emergency configuration took place and a priority ranking of reservations.

7. A network configuration control unit used for setting a network to a configuration based on reservation information wherein the network is formed by transmission apparatuses that are connected via communication paths, the network configuration control unit comprising:

an operational database which stores network configuration information, a reservation information database which stores information about network configuration reservations, a time management list which manages the reservation information in the reservation information database in time sequence, reservation processing means to perform opening reservations and closing reservations, time checking processing means that performs reserved configuration when set-up time arrives, continually comparing opening time and closing time in the time management list with present time.

8. The network configuration control unit as claimed in claim 7, wherein the time management list is a time management list that lists a unique reservation number in the reservation information database, an opening flag, an opening time, a closing flag and a closing time.

9. The network configuration control unit as claimed in claim 8, wherein the time checking processing means retrieves the reservation information from the reservation information database, using the reservation number as a key, and reflects the reservation information to the operational database, when time of the opening configuration time or the closing configuration time in the time management list arrives.

10. The network configuration control unit as claimed in claim 7, wherein the reservation processing means performs three kinds of reservation, namely opening reservation, closing reservation and simultaneous opening and closing reservation;

wherein the opening reservation is performed after a reference is made to the reservation information database to ascertain that a reserved section will not be in operation at the time of the opening; and wherein the closing reservation is performed after a reference is made to the reservation information database to ascertain that a reserved section will be in operation at the time of the closing.

11. The network configuration control unit as claimed in claim 7, further comprising a shunting database to which the reservation information stored in the reservation information database is saved;

wherein, when an emergency network configuration is performed, the reservation processing means uses direct access to the operational database to configure the network in an emergency, disregarding all reservations in the reservation information database, the reservation information in the reservation information database is saved to a shunting database, and the reservation information database is subsequently restored by first referring to the operational database, then referring to the shunting database.

* * * * *